United States Patent [19]

Wing et al.

[11] 3,979,286

[45] Sept. 7, 1976

[54] REMOVAL OF HEAVY METAL IONS FROM AQUEOUS SOLUTIONS WITH INSOLUBLE CROSS-LINKED-STARCH-XANTHATES

[75] Inventors: Robert E. Wing, Peoria; William M. Doane, Morton, both of Ill.

[73] Assignee: The United States of America as represented by the Secretary of Agriculture, Washington, D.C.

[22] Filed: Oct. 16, 1974

[21] Appl. No.: 515,262

[52] U.S. Cl. .............................................. 210/38 B
[51] Int. Cl.$^2$ ........................................ C02B 1/40
[58] Field of Search ............................. 210/52–54, 210/38 B, 59; 162/175; 260/233.5

[56] References Cited
UNITED STATES PATENTS

| 3,763,060 | 10/1973 | Hamerstrand et al. | 162/175 |
| 3,834,984 | 9/1974 | Wing et al. | 162/175 |

FOREIGN PATENTS OR APPLICATIONS

| 46-39544 | 11/1971 | Japan | 210/49 |

OTHER PUBLICATIONS

Swanson et al.; "Mercury Removal from Wastewater with a Starch Xanthate Cationic Polymer Complex" Environ. Sci. of Technol. 7, 614 (1973).

Wing et al.; "Heavy Metal Removal with Starch Xanthate–Cationic Polymer Complex" W.P.C.F. Journal vol. 46, No. 8, pp. 2043–2047 (8/1974).

Russell et al.; "Cereal Pulps I Preparation and Application of X–Linked Cereal Xanthates in Paper Products", Tappi vol. 45, No. 7 pp. 537–566, July 1962.

*Primary Examiner*—Charles N. Hart
*Assistant Examiner*—Benoit Castel
*Attorney, Agent, or Firm*—M. Howard Silverstein; David G. McConnell; Curtis P. Ribando

[57] ABSTRACT

An insoluble-starch-xanthate composition is prepared which is capable of removing most heavy metal ions from aqueous solutions. Concentrations of heavy metal ions contained in several industrial effluents were reduced to below the most stringent aqueous discharge limits.

4 Claims, No Drawings

REMOVAL OF HEAVY METAL IONS FROM AQEOUS SOLUTIONS WITH INSOLUBLE CROSS-LINKED-STARCH-XANTHATES

BACKGROUND OF THE INVENTION

This invention relates to a water-insoluble cross-linked-starch-xanthate composition useful for removing heavy metal ions from aqueous solutions.

In a previous abandoned patent application, Ser. No. 342,134, filed Mar. 16, 1973, herein incorporated by reference, a method was disclosed for removing heavy metal ions from aqueous solutions by precipitating a water-insoluble complex formed from water-soluble cationic polymer, a water-soluble starch-xanthate, and the heavy metal ions. It was also disclosed in the above-mentioned patent application that water-soluble starch-xanthate alone would coprecipitate with the heavy metal ions, but this coprecipitation resulted in a very inefficient heavy metal ion removal which did not meet present-day discharge limits. Because of our previous experience with the use of starch-xanthate in the removal of heavy metal ions from aqueous solutions, we were surprised to discover that heavy metal ions could be effectively removed from aqueous solutions by compositions comprising crosslinked-starch-xanthate having a degree of crosslinking (DCL) such that the crosslinked-starch-xanthate exhibits a degree of swelling in water at 95° C. of from 65% to 450%.

The compositions of this invention have all the objects and advantages disclosed in patent application Ser. No. 342,134, supra.

Crosslinked-starch-xanthate is defined herein as starch which has been crosslinked with the various known crosslinking agents and which is subsequently xanthated. Unless otherwise specified herein, the xanthate will be sodium xanthate.

DETAILED DESCRIPTION OF THE INVENTION

Crosslinked-starch starting materials, which are useful in accordance with the invention, include starches which have been crosslinked with epichlorohydrin, phosphorous oxychloride, sodium trimetaphosphate, anhydrides of dicarboxylic acids, acrolein, formaldehyde, glyoxal, and N-methylolureas (Encyclopedia of Polymer Science).

Crosslinked-starch-xanthates crosslinked with epichlorohydrin have the following general structure:

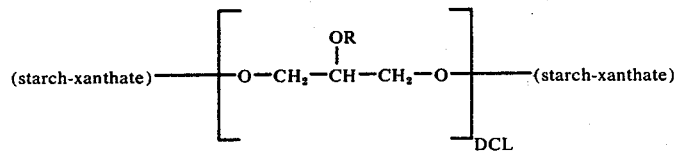

where R is —H or

crosslinked-starch-xanthates crosslinked with phosphorous oxychloride or sodium trimetaphosphate have the following general structure:

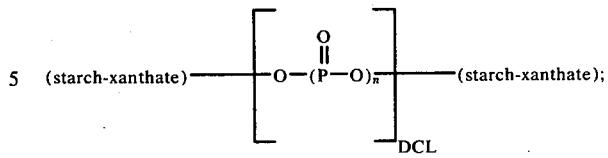

and crosslinked-starch-xanthates crosslinked with formaldehyde have the following general structure:

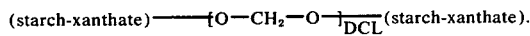

The type and degree of crosslinking must be such that sufficient reactive sites are available for attachment of xanthate groups and that the crosslinked-starch-xanthate product is water insoluble, at least in water of temperatures less than the gelatinization temperature of starch. However, in instances where the heavy metal-containing effluents are hot (i.e., temperatures of over 85° C.), the crosslinked-starch-xanthate should be sufficiently crosslinked so as to be insoluble at elevated temperatures. It is the degree of crosslinking that determines the insolubility of the crosslinked-starch starting material and of the xanthated product.

Insolubility in crosslinked polymers is usually defined in terms of gelation and swelling. At the gel point nonlinear polymers (in this instance crosslinked-starches) change from viscous liquids to elastic gels which are characterized as being nonfusable and insoluble (Paul J. Florey, "Principles of Polymer Chemistry," Cornell University Press, Ithaca, New York, 1953, p. 47). According to Florey, one crosslink between two primary polymer molecules is sufficient to bring on gelation (Florey, supra, p. 358). Crosslinked-starches having one crosslink between two starch molecules would, therefore, be theoretically useful as starting materials in the preparation of insoluble crosslinked-starch-xanthates. However, the degree of crosslinking in any polymer system is difficult to measure.

Florey (supra, pp. 581–583) shows that degree of crosslinking can be related to the degree of swelling that a network structure exhibits in a particular solvent system. As degree of crosslinking increases, degree of swelling decreases. Crosslinked-starches useful in accordance with the invention have a degree of crosslinking such that they exhibit a degree of swelling in water at 95° C. that ranges from 65% to 450% of the volume of unswollen crosslinked-starch. The crosslinked-starch-xanthates exhibit essentially the same degree of swelling as the crosslinked-starches from which they are prepared. Crosslinked-starch-xanthates having degrees of swelling of less than 75% are preferred in that they are sufficiently insoluble to be easily filtered after being used to remove heavy metal ions from solutions. However, the most highly swellable crosslinked-starch-xanthates, which would be difficult to filter, are useful in removing heavy metals from aqueous solutions, as long as they are adequately contacted with the heavy metal ions and recovered by some suitable means, such as centrifugation.

Operability of the crosslinked-starch-xanthates depends entirely on the number of xanthate groups attached to the compositions in comparison to the number of heavy metal ions in solution. Theoretically, one xanthate group (xan) for every metal ion (M) would remove all metal ions. For the reasons given above for the inability to accurately determine degree of crosslinking, it is difficult to accurately determine the molecular weight of the crosslinked-starch-xanthates. However, assuming a degree of crosslinking of 10 AGU/crosslink, the molecular weight of crosslinked-starch-xanthate having a xanthate degree of substitution (D.S.) of 0.2 would be about 3% greater than the corresponding noncrosslinked-starch-xanthate. Since 10 AGU/cl constitutes a highly crosslinked-starch, it becomes obvious that an error in the actual degree of crosslinking at any level would be insignificant when calculating the amount of composition necessary to give a 1:1 ratio of xan:M. To obtain a 1:1 molar ratio of xan:M, one mmole of heavy metal ion would require 0.91 g. of a crosslinked-starch-xanthate having a xanthate D.S. of 0.2 and a 10 AGU/cl degree of crosslinking. Xanthate D.S. is not critical. Decreasing xanthate D.S. in crosslinked-starch-xanthates simply requires more composition to maintain the necessary xan:M ratio. The preferred crosslinked-starch-xanthates have D.S.'s of from 0.1 to 1.0 and are effective in heavy metal ion removal.

Adding xanthates to aqueous solutions increases pH. Since pollution regulations usually require the effluent discharged in streams to have pH's of from 6–9, it is preferable that the amount of crosslinked-starch-xanthate added to heavy metal-containing industrial effluents be such that the final pH is within acceptable limits. This sometimes requires adding acid to the effluent.

Xanthation of starch is a well-known reaction (cf. "Starch: Chemistry and Technology," Whistler and Paschall, ed., Academic Press, New York and London, 1965, pp. 455–458) in which starch is contacted with carbon disulfide in a basic medium. The reaction of crosslinked-starch and varying amounts of base and carbon disulfide resulted in crosslinked products having varying xanthate D.S.'s, but all were effective in heavy metal ion removal. Times of xanthation of 1, 4, and 16 hours resulted in essentially the same products, all other parameters being the same. A 30-min. xanthation resulted in a slightly lower xanthate D.S. When solids concentration was increased from 10% to 25%, similar products were obtained.

Several work-up methods were evaluated including water washing on a filter followed by solvent drying; water washing with centrifugation, followed by solvent drying; and water washing with centrifugation followed by freeze drying. The only real difference with these washing treatments was the loss of base associated with the products when more water was used during centrifugation. This loss of base also accounts for the increase in percent sulfur of these products.

Since a considerable quantity of base remains in the filtrate and since large quantities of water would be required in large-scale production, the reuse of the mother liquor in subsequent xanthations was evaluated. Less base was used in each subsequent xanthation and from the product analysis a slightly less xanthated product was obtained. There was also a considerable decrease in the percent ash, which is an indirect measure of the base still associated with the product. Therefore, if the mother liquor is to be reused, sufficient base should be added to bring the base concentration up to that used in the initial xanthation.

Since a basic medium is used for both crosslinking and xanthation, an investigation was made of the preparation of crosslinked-starch-xanthate without isolation of the crosslinked intermediate. After the starch had been crosslinked, additional base and then carbon disulfide were added. The products obtained were essentially the same as those obtained in a separate two-step reaction and were effective in removing heavy metal ions from solutions.

Several approaches were investigated to prepare products which would have room temperature stability. Spray drying reduced the moisture content to 3% and such a product was stable at room temperature for several months. Vacuum oven drying at temperatures of 30°–50° C. for several hours yielded products with 7–10% moisture. These products showed some decomposition when left at room temperature. Moreover, conversion of crosslinked-starch-xanthate into crosslinked-starch-xanthide with sodium nitrite did yield a product stable at room temperature. This product, however, was only effective in heavy metal ion removal when the crosslinked-starch-xanthate was regenerated by adjusting the pH to above 7.

Conversion of the crosslinked-sodium-starch-xanthate to either the calcium or magnesium form was accomplished by simply washing the product with the appropriate chloride salt. Calcium, magnesium, and sodium analyses of these products showed that this exchange procedure was 99% effective. The magnesium insoluble-starch-xanthate had good room temperature stability for several months and was very effective in metal removal. The calcium insoluble-starch-xanthate was more stable than the sodium form, but there was enough decomposition after several months of storage to render it ineffective in metal removal. It is effective when freshly made.

Crosslinked-starch-xanthate was tested periodically for apparent stability by evaluating its effectiveness to remove copper from solution. Since copper was effectively removed with the same amount of insoluble-starch-xanthate stored at 0° or at room temperature with a moisture content of <3%, it was assumed there was little decomposition.

The following examples are intended to further describe the invention and are not to be construed as limiting the scope of the invention which is defined by the claims.

EXAMPLES 1–13

Degrees of swelling were determined for several crosslinked-starches by the following method:

A. Apparatus

Mechanical stirrer
Stirring blade — triangular glass plate (¾ base × 4 inches height) twisted in a spiral connected to a drive shaft (glass rod 8 mm.) at the base of the triangle
Centrifuge tube, 40 ml., graduated, Pyrex 8340
Pipette, 25 ml.
Dishes, evaporating, Coors, approximately 3 inches diameter Optically clear test tube, 18 mm. × 180 mm.
Glass rod with rubber tip

B. Procedure

Into a dried, tared centrifuge tube was placed 0.8000 g. dry basis of the crosslinked-starch or crosslinked-starch-xanthate to be tested and a sufficient amount of distilled water was added to bring the slurry to the 40 ml. mark. The weight of the tube and slurry was noted to the nearest 0.1 g.

The centrifuge tube was immersed in a water bath at 95° C. for 30 min. with stirring at 500 r.p.m. Stirrer should operate in the direction which imparts a downward thrust in the slurry.

After pasting for 30 min., the tube and stirrer were removed, cooled to room temperature, and sufficient distilled water was added to the tube to achieve the noted weight. It is recommended to add the water with a micropipette washing the stirrer as the water is being added. To dislodge particles on the stirrer, a rubber-tipped glass rod is helpful. The sample was stirred 5 min. at 500 r.p.m. with NO heat to disperse the added water evenly into the paste.

The tube was removed and the stirrer wiped off with the rubber-tipped glass rod to recover as much of the paste as possible. The tube was centrifuged for 15 min. at 2,500 r.p.m. The tube contained two layers—a supernatant and a sediment.

With the aid of the graduated marks, the volume of the sediment in the tube was determined.

The procedure was repeated with the exception that samples were maintained at 25° to prevent swelling. The sediment volumes for the nonswelled samples were about 1.5 ml. Degree of swelling was calculated as follows and reported in Table 1:

$$\text{degree of swelling, \%} = \frac{\text{sediment vol. 95°C.} - \text{sediment vol. 25°}}{\text{sediment vol. 25°}} \times 100.$$

Crosslinked-starches A through F above were obtained commercially. Product G was prepared as follows: 506 g. corn starch were slurried in 650 ml. water containing 7.5 g. of sodium chloride and 27.8 ml. of epichlorohydrin, and 30 g. KOH in 100 ml. water were added in 4-ml. portions every 10 min. The slurry was stirred for 20 hours, neutralized with HCl, filtered, washed successively with water, acetone and ether, and oven dried. Degree of swelling was determined as above.

Crosslinked-starches A through F above were slurried with potassium or sodium hydroxide in an amount of water approximately equal to 10 times the amount of crosslinked-starch by weight, and the mixture was stirred for 30 min. at 25° C. Crosslinked-starch G above was treated in the same manner except that the amount of water was approximately equal to four times the amount of crosslinked-starch G, by weight. Carbon disulfide was then added, and the mixture was stirred for approximately 16 hours at 25° C. The slurry was filtered, and the solid product was washed successively with water (75 ml.), several portions of acetone (500 ml. total), and ether (100 ml.), and dried in a vacuum oven at 25° C. for 2 hours. Weights and volumes of reactants and analysis of the final products are disclosed in Table 2. Moisture analysis was run at 25° C. under vacuum for 2–3 hours and is uncorrected for xanthate decomposition that may have occurred. Percent ash includes metal ion of xanthate and bound alkali in product.

EXAMPLES 14–18

Crosslinked-starch A was xanthated as described in Examples 1–12 with the exception that the time of xanthation was varied from 0.5 to 16 hours. Weights and volumes of reactants and analysis of the final products are disclosed in Table 3.

EXAMPLES 19–21

Crosslinked-starch A (35.4 g.) was xanthated as described in Example 3 (0.4 mole of NaOH and 0.08 mole of $CS_2$). The crosslinked-starch-xanthate products were recovered by various means. In Example 19 the solid product was washed successively with water, acetone, and ether followed by vacuum oven drying as in Examples 1–13; Example 20 was centrifuged four times with water (800 ml. total), then treated as in Example 19 above; and Example 21 was centrifuged Table 1

| Crosslinked-starch | Crosslinking reagent | Volume, ml. | Degree of swelling, % |
|---|---|---|---|
| Std. (cold) | Epichlorohydrin | 1.5 | — |
| A | Epichlorohydrin | 2.5 | 67 |
| B | Phosphorous oxychloride | 2.5 | 67 |
| C | Epichlorohydrin | 2.6 | 73 |
| D | Epichlorohydrin | 3.6 | 140 |
| E | Epichlorohydrin | 6.1 | 306 |
| F | Epichlorohydrin | 8.2 | 446 |
| G | Epichlorohydrin | 2.9 | 93 |

Table 2

| Example | Crosslinked-starch | Starch weight, g. | Base | Moles | Carbon disulfide, moles | Product weight, g. | D.S. | % Ash | % $H_2O$ |
|---|---|---|---|---|---|---|---|---|---|
| 1 | A | 35.4 | NaOH | 0.2 | 0.08 | 43.0 | 0.15 | 15.7 | 12.2 |
| 2 | A | 35.4 | NaOH | 0.2 | 0.16 | 41.0 | 0.19 | 11.7 | 9.6 |
| 3 | A | 35.4 | NaOH | 0.4 | 0.08 | 48.4 | 0.18 | 22.1 | 15.6 |
| 4 | A | 35.4 | NaOH | 0.4 | 0.16 | 50.0 | 0.28 | 22.2 | 14.9 |
| 5 | A | 70.8 | NaOH | 0.8 | 0.16 | 95.6 | 0.16 | 19.9 | 16.3 |
| 6 | A | 35.4 | KOH | 0.2 | 0.08 | 41.4 | 0.14 | 12.6 | 6.1 |
| 7 | A | 35.4 | KOH | 0.4 | 0.16 | 48.1 | 0.31 | 15.9 | 9.8 |
| 8 | A | 10.0 | KOH | 0.8 | 0.40 | 16.0 | 0.60 | 30.3 | 8.6 |
| 9 | C | 35.4 | NaOH | 0.2 | 0.08 | 43.1 | 0.13 | — | — |
| 10 | C | 35.4 | KOH | 0.4 | 0.16 | 49.0 | 0.33 | 21.5 | 9.6 |
| 11 | F | 35.4 | KOH | 0.4 | 0.16 | 48.9 | 0.32 | 24.8 | 8.5 |
| 12 | B | 35.4 | KOH | 0.4 | 0.16 | 51.8 | 0.31 | 25.9 | 11.9 |

Table 2-continued

| Example | Crosslinked-starch | Starch weight, g. | Base | Moles | Carbon disulfide, moles | Product weight, g. | D.S. | % Ash | % H₂O |
|---|---|---|---|---|---|---|---|---|---|
| 13 | G | 177.0 | NaOH | 1.0 | 0.40 | 225.0 | 0.24 | 14.9 | 15.1 |

Table 3

| Example | Xanthation time, hours | Starch weight, g. | NaOH, moles | CS₂, moles | Product weight, g. | D.S. | % Ash | % H₂O |
|---|---|---|---|---|---|---|---|---|
| 14 | 0.5 | 35.4 | 0.4 | 0.08 | 42 | 0.14 | 11.4 | 13.0 |
| 15 | 0.5 | 35.4 | 0.4 | 0.08 | 43 | 0.19 | 19.1 | 14.3 |
| 16 | 1 | 100 | 1.1 | 0.24 | 133.5 | 0.18 | 13.4 | 19.1 |
| 17 | 4 | 35.4 | 0.4 | 0.08 | 48.4 | 0.18 | 16.7 | 14.3 |
| 18 | 16 | 35.4 | 0.4 | 0.08 | 48.4 | 0.18 | 22.1 | 15.6 | four times with water (800 ml. total), then freeze dried in water. Analyses of the final products are disclosed in Table 4.

Table 4

| Product weight, g. | D.S. | % Ash | % H₂O |
|---|---|---|---|
| 53.0 | 0.15 | 34.3 | 18.5 |
| 42.8 | 0.18 | 12.8 | 8.6 |
| 42.0 | 0.25 | 9.2 | 6.6 |

EXAMPLE 22

Crosslinked-starch A (100 g.) was xanthated as described in Example 16 (1.1 moles NaoH and 0.24 mole CS₂). The mixture was filtered and washed with a small volume of water to give 400 ml. of mother liquid, which was saved for subsequent xanthation. The product was removed as described in Examples 1-13 (Table 5).

EXAMPLE 23

Crosslinked-starch A (100 g.) was slurried in the mother liquor of Example 22 to which 0.6 mole of NaOH and 0.24 mole of CS₂ were added and stirred for 16 hours at 25° C. The mother liquor and products were recovered as described in Example 22 (Table 5).

EXAMPLE 24

Crosslinked-starch A (100 g.) was xanthated in the mother liquor of Example 23 to which 0.3 mole of NaOH and 0.24 mole of CS₂ were added, and the mother liquor and xanthation products were recovered as described in Example 22 (Table 5).

EXAMPLE 25

Crosslinked-starch A (100 g.) was xanthated in the mother liquor of Example 24 to which 0.3 mole of NaOH and 0.24 mole of CS₂ were added, and the products were recovered as described in Example 22 (Table 5).

Table 5

| Example | Product weight, g. | D.S. | % Ash | % H₂O |
|---|---|---|---|---|
| 22 | 128.3 | 0.17 | 16.6 | 13.1 |
| 23 | 127.5 | 0.11 | 14.0 | 14.1 |
| 24 | 119.3 | 0.12 | 9.1 | 11.3 |
| 25 | 119.2 | 0.12 | 8.8 | 11.2 |

EXAMPLE 26

A. Commercial corn starch (100 g., 10% H₂O) was slurried in water (150 ml.) containing sodium chloride (1.5 g.) and epichlorohydrin (5.5 ml.). To this slurry was added potassium hydroxide (6 g.) in water (40 ml.) slowly over 30 min. The slurry was warmed to 50° C. and then cooled to room temperature. Water (50 ml.) and epichlorohydrin (2 ml.) were added, and the mixture was stirred for 16 hours. The suspension, now containing highly crosslinked-starch, was treated with sodium hydroxide (1.2 moles) in water (250 ml.). Carbon disulfide (0.24 mole) was added near the bottom of the beaker, and the mixture was stirred for 16 hours. The mixture was filtered and was washed with water (100 ml.), acetone (750 ml.), and ether (200 ml.). After drying for 2 hours under vacuum, the product was analyzed. Yield: 132.2 g.; D.S. 0.15; H₂O, 11.4%; ash, 14.3%.

B. The reaction was repeated on 506 g. starch but without the heating step, the additional water, and epichlorohydrin during crosslinking. Yield: 657 g.; D.S. 0.21; H₂O, 18.1%; ash, 19.5%.

EXAMPLE 27

Crosslinked-starch A (177 g.) was slurried in water (655 ml.) and sodium hydroxide (1.0 mole) in water (100 ml.) was added. Carbon disulfide (0.4 mole) was added below the liquid surface, and the mixture was stirred for 16 hours. The mixture was centrifuged and washed four tmes with water (1,600 ml. total) in centrifuge bottles. The product was suspended in water (500 ml.) to give a final volume of 1,000 ml. This suspension was stirred and pumped into a NIRO portable spray drier (Copenhagen, Denmark) at a rate of 3 l./hour (spindle speed, 35,000 r.p.m.; inlet temperature, 260° C.; and outlet temperature, 118°C.). Yield: 190 g.; D.S. 0.25; H₂O, 3.0%; ash, 11.6%.

EXAMPLE 28

Crosslinked-starch-xanthate was prepared as described in Example 13. Before filtration the reaction mixture was treated successively with glacial acetic acid (20 ml.), sodium nitrite (28.5 g./50 ml. water), and 6N HCl (250 ml.). The mixture was stirred for 30 min., and the final pH was 3.8. The resulting crosslinked-starch-xanthide was filtered, washed with water (400 ml.), acetone (750 ml.), and ether (400 ml.), and dried in a vacuum oven at room temperature for 5 hours. Yield: 110.8 g.; D.S. 0.10; H₂O, 6.7%; ash, 0.9%.

EXAMPLE 29

Crosslinked-sodium-starch-xanthate was prepared as described in Example 13. After filtration the product was washed with water (200 ml.) and a solution (200 ml.) of calcium chloride (20 g.). Following the usual wash with acetone and ether, the crosslinked-calcium-starch-xanthate product was dried for 4 hours in a vacuum oven. Yield: 172 g.; D.S. 0.14; $H_2O$, 11.9%; ash, 7.2%.

EXAMPLE 30

Example 29 was repeated with the exception that magnesium chloride hexahydrate (40 g.) was substituted for the calcium chloride. Yield: 134.5 g.; D.S. 0.13; $H_2O$, 13.3%; ash, 10.7%.

EXAMPLE 31

Aqueous solutions of metal salts having various metal ion concentrations were prepared and treated as follows: amounts of the crosslinked-starch-xanthate from Example 3 of from 0.04 to 0.07 g. were added to 50 ml. of each metal ion solution. The solution was stirred for 2 hours at 25° C. and then filtered. Residual metal ion was determined for each filtrate using a Varian Techtron AA120 spectrophotometer. The resulting residual metal ion determinations were compared to State of Illinois discharge limits for public and food processing waters (Illinois Pollution Control Board, Newsletter No. 44, page 7, March 1972) (Table 6).

EXAMPLE 32

Examples 22 and 25 were used to treat a solution containing copper ion in the manner described in Example 31 (Table 7).

EXAMPLE 33

Example 3 was stored at 0° C. for 43 weeks. Samples were periodically removed from storage and used to treat a solution containing 31,770 µg. [Cu]/1. as described in Example 31 (Table 8).

Table 8

| Product age, weeks | Xanthate weight, g. | Residual [Cu], ug./l. |
|---|---|---|
| 1 | 0.0544 | 14 |
| 1 | 0.0495 | 12 |
| 2 | 0.0522 | 12 |
| 10 | 0.0459 | 39 |
| 23 | 0.0491 | 25 |
| 43 | 0.0516 | 31 |

Table 6

| Metal | Initial concn., µg./l. | Initial pH | Final pH | Residual metal, µg./l. | Illinois discharge limit, µg./l. |
|---|---|---|---|---|---|
| $Cu^{+2}$ | 31,770 | 3.4 | 6.4 | 7 | 20 |
| $Ni^{+2}$ | 29,350 | 3.2 | 7.7 | 19 | 1,000 |
| $Cd^{+2}$ | 56,200 | 3.0 | 6.8 | 9 | 50 |
| $Pb^{+2}$ | 103,600 | 3.1 | 7.3 | 25 | 100 |
| $Cr^{+3}$ | 26,000 | 3.2 | 6.5 | 3 | 1,000 |
| $Ag^+$ | 53,940 | 3.1 | 7.2 | 245 | 5 |
| $Zn^{+2}$ | 32,690 | 3.1 | 7.5 | 46 | 1,000 |
| $Fe^{+2}$ | 27,920 | 3.0 | 6.4 | 0 | 1,000 |
| $Mn^{+2}$ | 27,470 | 3.3 | 9.0 | 1,628 | 1,000 |
| $Hg^{+2}$ | 100,000 | 3.1 | 4.2 | 3 | 0.5 |

Table 7

| Crosslinked-starch-xanthate Example | weight, g. | Initial [Cu], µg./l. | Initial pH | Final pH | Residual [Cu], µg./l. |
|---|---|---|---|---|---|
| 22 | 0.0554 | 31,770 | 3.0 | 8.7 | 11 |
| 25 | 0.0515 | 31,770 | 3.0 | 7.4 | 11 |

EXAMPLE 34

Example 26B was used to treat solutions containing various concentrations of copper ion. The treatment was the same as that described in Example 31, except that the mixture was stirred for 30 min. instead of 2 hours (Table 9).

EXAMPLE 35

Nine industrial effluents containing a variety of heavy metal ions were treated in the same manner as described in Example 31. The crosslinked-starch-xanthate used was Example 26B, and the mixtures were stirred for 1 hour (Table 10).

Table 9

| Initial [Cu[, µg./l. | Initial pH | Crosslinked-starch-xanthate weight, g. | Final pH | Residual [Cu], µg./l. |
|---|---|---|---|---|
| 320 | 4.8 | 0.0003 | 8.0 | 16 |
| 3,200 | 3.7 | 0.0099 | 8.5 | 159 |
| 32,000 | 3.9 | 0.0338 | 8.0 | 13 |
| 96,000 | 3.5 | 0.1021 | 8.6 | 16 |
| 320,000 | 3.0 | 0.3000 | 8.0 | 40 |

Table 10

| Industrial effluent sample | | Initial pH | Insoluble starch xanthate weight, g. | Final pH | $Cd^{+2}$ | $Cr^{+3}$ | $Cu^{+2}$ | $Fe^{+2}$ | $Pb^{+2}$ | $Hg^{+2}$ | $Ni^{+2}$ | $Zn^{+2}$ |
|---|---|---|---|---|---|---|---|---|---|---|---|---|
| A | Initial | 7.5 | — | — | | | | 34,640 | | | | |
|   | treated | — | 0.0612 | 9.0 | | | | 120 | | | | |
| B | initial | 7.6 | — | — | | | | | | | 923,000 | |
|   | treated | — | 0.9238 | 10.7 | | | | | | | 34 | |
| C | initial | 3.5 | — | — | | | | | | | | 4,836 |
|   | treated | — | 0.0315 | 7.7 | | | | | | | | 16 |
| D | initial | 5.3 | — | — | 87 | 250,000 | 150 | 3,045 | 555 | | | |
|   | treated | — | 0.1596 | 6.7 | 5 | 216 | 16 | 0 | 0 | | | |
| E | initial | 5.3 | — | — | 150 | 19,444 | 105 | | | | | |
|   | treated | — | 0.0416 | 7.3 | 4 | 13 | 9 | | | | | |
| F | initial | 5.1 | — | — | 333 | 3,611 | 1,340 | 47,180 | 267 | | 6,640 | |
|   | treated | — | 0.2892 | 6.2 | 13 | 744 | 16 | 3,227 | 0 | | 55 | |
| G | initial | 4.4 | — | — | 147 | 2,833 | 105 | | | | | |
|   | treated | — | 0.0302 | 7.0 | 0 | 222 | 0 | | | | | |
| H | initial | 3.1 | — | — | 833 | | 217 | | | | | |
|   | treated | — | 0.0510 | 7.5 | 17 | | 0 | | | | | |

Table 10-continued

| Industrial effluent sample | Initial pH | Insoluble starch xanthate weight, g. | Final pH | Cd$^{+2}$ | Cr$^{+3}$ | Cu$^{+2}$ | Fe$^{+2}$ | Pb$^{+2}$ | Hg$^{+2}$ | Ni$^{+2}$ | Zn$^{+2}$ |
|---|---|---|---|---|---|---|---|---|---|---|---|
| I initial | 4.5 | — | — | 4,197 | 20,000 | 141,000 | | 13,111 | | | |
| treated | — | 0.2452 | 7.1 | 15 | 17 | 100 | | 166 | | | |

We claim:

1. A process of removing heavy metal ions from aqueous solutions comprising contacting heavy metal ions in aqueous solutions with an amount of a water-insoluble crosslinked-starch-xanthate, wherein said crosslinked-starch-xanthate has been prepared by first crosslinking starch with a crosslinking reagent and subsequently xanthating the crosslinked starch by reacting the same with carbon disulfide, and wherein said crosslinked-starch-xanthate has a degree of crosslinking (DCL) such that said crosslinked-starch-xanthate exhibits a degree of swelling in water at 95° C. of from 65% to 450%, said amount of crosslinked-starch-xanthate being such that the molar ratio of the xanthate moiety to metal ions is about 1:1, and removing said heavy metal ions from said aqueous solution.

2. A process as described in claim 1 wherein the crosslinked-starch-xanthate has the following general structure:

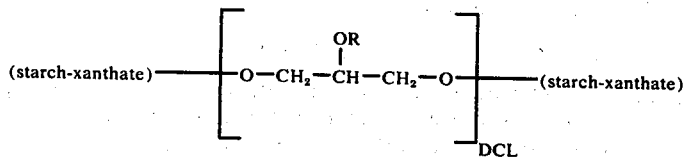

where R = —H or

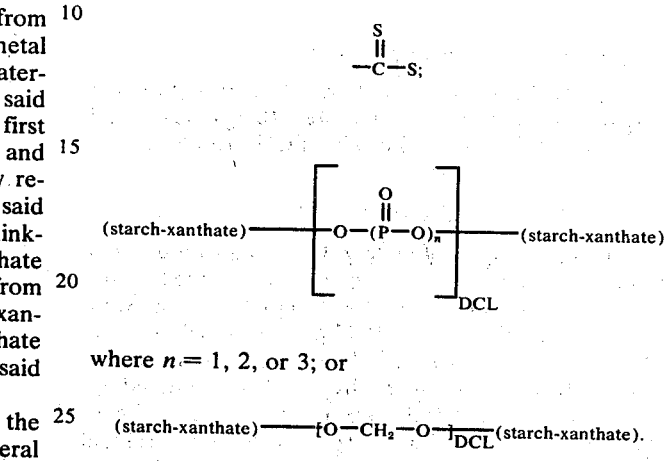

where $n$ = 1, 2, or 3; or (starch-xanthate)——[O—CH$_2$—O—]$_{DCL}$(starch-xanthate).

3. A process as described in claim 1 wherein the crosslinked-starch-xanthate exhibits a degree of swelling of from 65% to 75%.

4. A process as described in claim 1 wherein the crosslinked-starch-xanthate has a xanthate degree of substitution of from 0.1 to 1.

* * * * *

PO-1050
(5/69)

UNITED STATES PATENT OFFICE
CERTIFICATE OF CORRECTION

Patent No. 3,979,286          Dated September 7, 1976

Inventor(s) Robert E. Wing and William M. Doane

It is certified that error appears in the above-identified patent and that said Letters Patent are hereby corrected as shown below:

Column 1, line 2 of the Title, cancel "AQEOUS" and insert -- AQUEOUS -- .
Column 9, line 9, cancel "172" and insert -- 127 -- .
In Table 10, insert -- ug./l. -- as heading for the designated cations.

Signed and Sealed this

Fifteenth Day of March 1977

[SEAL]

Attest:

RUTH C. MASON
Attesting Officer

C. MARSHALL DANN
Commissioner of Patents and Trademarks